Nov. 29, 1938.    N. P. WORDEN ET AL    2,138,083
LAMP STRUCTURE
Filed March 29, 1937
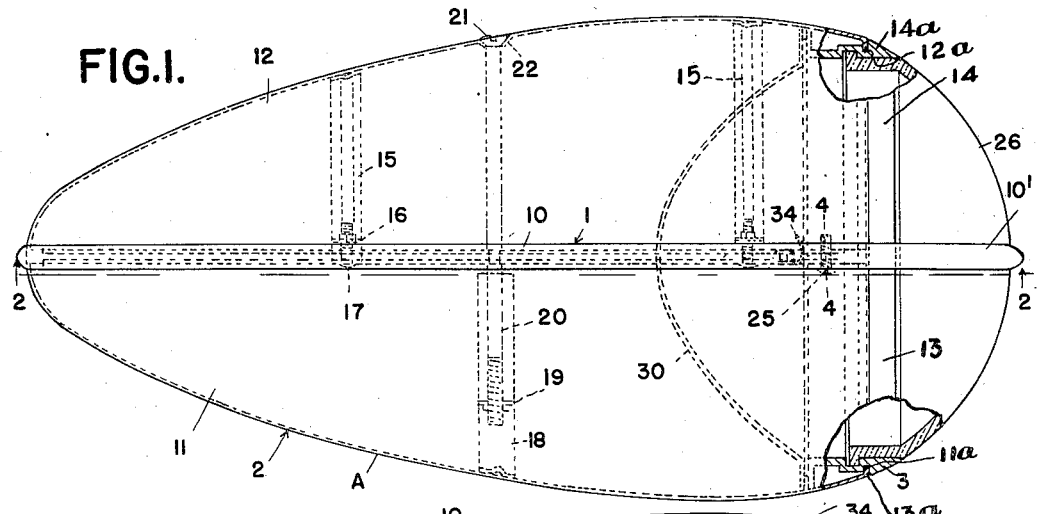
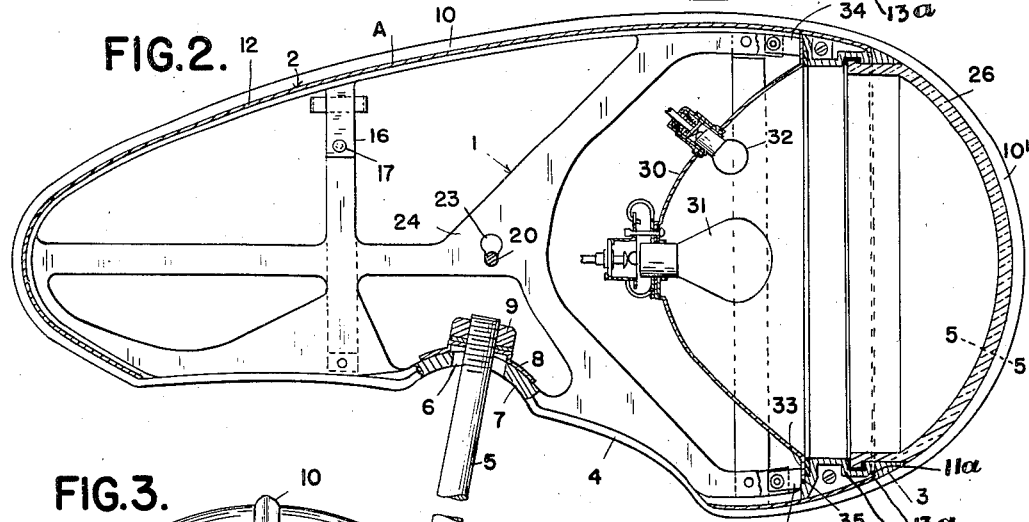
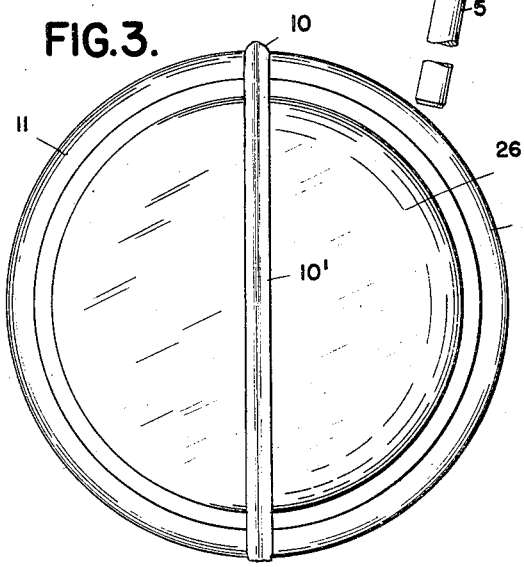
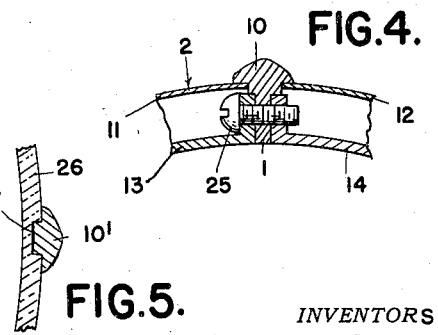
INVENTORS
NORBERT P. WORDEN
HOTHER S. PEDERSEN
BY
ATTORNEYS Patented Nov. 29, 1938

2,138,083

UNITED STATES PATENT OFFICE 2,138,083

LAMP STRUCTURE

Norbert P. Worden and Hother S. Pedersen, Detroit, Mich., assignors to C. M. Hall Lamp Company, Detroit, Mich., a corporation of Michigan Application March 29, 1937, Serial No. 133,665

4 Claims. (Cl. 240—41.5)

This invention relates generally to lamps for motor vehicles and refers more particularly to the type designed for use as head lamps.

One of the essential objects of the invention is to provide a lamp of this type wherein the housing has a frame adapted to be mounted upon a suitable support such as a fender or radiator of a motor vehicle and has a sheathing that is connected to said frame in such a way that a portion of the sheathing may be removed at will to afford access to the interior of said housing for any purpose. For example, when the mounting for the lamp includes a stud adjustably connected to the frame of the housing within the latter, it is only necessary to remove a portion of the sheathing to render the stud connection with the frame accessible for adjustment purposes. Thus, when our lamp structure is mounted upon a fender of a motor vehicle, it will be unnecessary to get under the fender to make any adjustment. In the event a bulb or lighting unit is adjustably mounted within the housing, it is possible with our construction to reach such bulb or unit to change or replace the same by simply removing a portion of the sheathing aforesaid. Aside from the foregoing, our construction is dust and moisture proof and enhances the appearance of the lamp In this connection it will be noted that a bead-like portion of the frame is exposed and may be chromium plated, while the sheathing upon opposite sides of the bead may be colored or painted as desired.

Other objects, advantages and novel details of construction of this invention will be made more apparent as this description proceeds, especially when considered in connection with the accompanying drawing, wherein:

Figure 1 is a top plan view of a lamp housing embodying our invention;

Figure 2 is a vertical sectional view taken substantially on the line 2—2 of Figure 1;

Figure 3 is a front elevation of the housing;

Figure 4 is a fragmentary sectional view taken substantially on the line 4—4 of Figure 1;

Figure 5 is a sectional view taken on the line 5—5 of Figure 2.

Referring now to the drawing, A is a lamp housing of substantially ovoid configuration having a frame 1, sheathing 2 for said frame and a bezel 3. As shown, the frame 1 is a die casting and has an arched portion 4 at the bottom thereof serving as a mounting bracket for the housing. Preferably this bracket portion 4 is adjustably connected to a stud 5 that may be mounted upon any suitable support (not shown) such as a fender or radiator of a motor vehicle. In the present instance tnis stud 5 is received in a slot 6 in a concavo-convex part 7 of the bracket portion 4 of the frame and is engaged above, said part by a washer 8 and a nut 9. Thus, in effect, a ball and socket mounting for the lamp is provided.

Extending lengthwise in a vertical plane about the housing A, with the exception of the bracket portion 4 at the bottom of the frame, is a bead 10 that is preferably integral with the frame and follows the contour of the housing. In the present instance this bead 10 forms a division or parting line between portions 11 and 12 respectively of the sheathing and between sections 13 and 14 respectively of the bezel. As shown, the portions 11 and 12 of sheathing are formed of sheet metal and abut opposite sides of said bead. Preferably strip-like brackets 15 are welded to the portion 12 and have flanges 16 fastened by screws 17 to the bead 10 at spaced points longitudinally thereof, while a strip-like bracket 18 is welded to the portion 11 substantially midway of its ends and has a flange 19 fastened by a relatively long screw 20 to the portion 12, the head 21 of said screw 20 being in a countersunk portion 22 of the portion 12. Thus, the brackets 15 and screws 17 hold the portion 12 to the frame, while the bracket 18 and screw 20 serve as a tie or connection between both portions 11 and 12. Preferably the last mentioned screw 20 also engages a keyhole slot 23 in a web 24 of the frame.

The bezel sections 13 and 14 are die castings and abut opposite sides of the bead 10 in advance of the sheathing sections 11 and 12. Preferably these bezel sections 13 and 14 have suitable recesses or grooves 13a and 14a, respectively, receiving inturned flanges 11a and 12a of the sheathing sections, and are fastened by screws 25 to the bead 10 so as to hold the lens 26 in place. The lens 26 is fluted and prismed and is provided in its outer face with a channel or groove 27 for the reception of the curved forward portion 10' of the bead.

To complete the lamp assembly, there is a reflector 30 in rear of the bezel carrying suitable electric light bulbs 31 and 32. Preferably this reflector has a flange 33 held by spring clips 34 against a shoulder 35 of the bezel.

Thus, with this construction the portion 11 of the sheathing may be removed after the screw 20 has been unfastened to afford access to the nut 9 should it be desired to change the adjustment of the lamp housing on the stud 5, or to afford access to the bulbs 31 and 32 should it be desired to change or replace the same.

If desired, the lamp housing A may have a rigid mounting instead of the adjustable one afforded by the slot 6, and a hermetically-sealed unit and any adjustable mounting therefor such as that illustrated in the pending applications of Arnold N. Taylor and Norbert P. Worden, Serial Nos. 124,765, 124,766 and 125,848 filed February 8, 1937, February 8, 1937, and February 15, 1937, respectively, may be substituted for the reflector 30 and bulbs 31 and 32. In any event, the removability of one or both portions 11 and 12 of the sheathing will afford access to the interior of the housing A for adjusting purposes or for replacement of the lighting unit.

What we claim as our invention is:

1. In a lamp structure, a housing having a frame and a sectional sheathing for said frame, a portion of said frame being between the sections of said sheathing, brackets rigid with one section of said sheathing and fastened to said frame portion, a bracket rigid with another section of said sheathing, said frame having a slot therein, and means for connecting the second mentioned section of said sheathing to the first mentioned section including means engaging the slot in said frame.

2. A lamp housing of substantially ovoid configuration having a frame, a sectional sheathing for said frame, and a sectional bezel, said frame having a bead extending completely about and substantially in conformity with the longitudinal contour of the housing and forming a divider between the sections of the sheathing and between the sections of said bezel, said bezel sections abutting opposite sides of said bead, and said sheathing sections abutting opposite sides of said bead and having interlocking engagement with said bezel sections.

3. A lamp housing of substantially ovoid configuration having a frame, a sectional sheathing for said frame, and a sectional bezel, said frame having a bead extending completely about and substantially in conformity with the longitudinal contour of the housing and forming a divider between the sections of the sheathing and between the sections of said bezel, said sheathing sections being of sheet metal and having inturned flanges, and said bezel sections having cast metal portions recessed to receive the inturned flanges of said sheet metal sheathing sections.

4. A lamp housing of substantially ovoid configuration having a substantially flat web-like frame, a sectional sheathing for said frame, and a sectional bezel, said frame having a bead following throughout the longitudinal contour of said housing forming a divider between the sections of said sheathing and between the sections of said bezel, strip-like brackets fixed to one section of the sheathing at spaced points longitudinally thereof and fastened to the web of said frame, a strip-like bracket fixed to the other section of said sheathing substantially midway of its ends, and a screw threadedly engaging the last mentioned bracket and extending through and accessible from the outside of the first mentioned section, said screw also engaging an opening in the web of said frame.

NORBERT P. WORDEN.
HOTHER S. PEDERSEN.